Patented Mar. 7, 1944

2,343,760

UNITED STATES PATENT OFFICE 2,343,760

SMELTING OF DROSSES, MATTES, AND THE LIKE

Edward P. Fleming, Los Angeles, Calif., and Donald H. McIntosh, Corpus Christi, Tex., assignors to American Smelting and Refining Company, New York, N. Y., a corporation of New Jersey No Drawing. Application July 3, 1942, Serial No. 449,662

10 Claims. (Cl. 75—24)

This invention relates to the metallurgical processes and more particularly to smelting of drosses, mattes, and the like, containing substantial quantities of copper and lead.

In the processes normally practiced in the recovery of lead and copper from ores containing these metals, there is produced a copper-lead dross. This dross as a general rule will contain magnetic oxide of iron which may vary in amounts from 2 to 5 per cent by weight, which makes it refractory to smelt by known processes. It has heretofore been standard practice to remove this iron as a silicate slag by adding siliceous ores and scrap iron and smelting in a reverberatory furnace operated at a temperature between 1300° and 1400° C. Maintaining this relatively high temperature results in high fuel consumption, a copper speiss or matte of relatively low copper to lead ratio, a slag high in lead and copper that must be retreated in a lead blast furnace, and a lead bullion from the reverberatory containing substantial quantities of copper, very frequently of the order of two and a half per cent.

It will be apparent that such practice entails a large circulating load of copper, making increased tonnage of copper-lead dross to be resmelted although one of the important purposes in the smelting operations is the separation of the copper and lead so as to produce bullion as free from copper as possible and a copper matte or speiss product as free from lead as possible. But the prior standard commercial practice has fallen far short in attaining the most desirable goal. In fact, the method heretofore constituting standard practice results in the production of a copper product with a low copper to lead ratio; whereas it is of great economical advantage to produce a copper product of high copper to lead ratio because very frequently this product must be shipped from the lead smelter to copper plants which may be at greater or less distances away.

The shipment of the copper product containing large quantities of lead entails high freight costs and high treatment costs at the copper plant per ton of copper, and a large loss of lead at the copper plant. The lead recovered in the copper plant will be obtained usually in the form of fume which must be converted to bullion, so it is usually returned to the lead smelter with consequent further losses and costs of treatment of the fume to convert it to bullion.

In accordance with the present invention, the undesirable drawbacks of the foregoing practice are minimized or eliminated in that copper-lead dross may be treated in the reverberatory furnace to produce lead which has a very low copper content and at the same time a copper speiss with a high copper to lead ratio.

According to the invention, a flux is provided which on mixture with the dross to be smelted permits of treatment in the reverberatory furnace at a temperature of 800°–1000° C., resulting in lower fuel consumption than is required in the standard processes heretofore practiced wherein the operating temperatures are considerably higher. Moreover, the flux hereinafter described in more detail, when mixed with copper lead dross and the charge smelted in the reverberatory, will cause a slag to be formed in which the magnetic oxide of iron and other refractory substances, such as small amounts of silica, will collect. The slag, which may be currently drawn off, will contain practically all the iron and sulphur contained in the dross and generally will itself have a good enough copper-lead ratio to allow of shipment direct to the copper smelter. The copper speiss product will have a copper to lead ratio of the order of 5 to 6 to 1 and the lead bullion from the reverberatory will have a copper content of less than one per cent.

Although the novel features which are believed to be characteristic of this invention will be particularly pointed out in the claims appended hereto, the invention itself, as to its objects and advantages, and the manner in which it may be carried out, may be better understood by referring to the following description in which certain specific disclosures are made for purpose of explanation. It will be understood, however, that the processes and the steps thereof may be modified in various respects without departing from the broader aspects of the invention.

In one manner of practicing the invention, one hundred and forty-four tons of copper-lead dross were intimately mixed with a flux containing sodium carbonate, coke and litharge and treated in the reverberatory at a working temperature of about 900° C. The dross to be treated contained 62% Pb, 18% Cu, 7.8% As, 3.2% Sb. Seven tons of sodium carbonate, two tons of coke and three and seven-tenths tons of litharge slag were used as the flux. The litharge slag contained 55% Pb, 1.0% Cu, .05% As and .05% Sb and was produced by smelting bag house dust.

The amounts and assays of the products resulting from the treatment of the foregoing charge were as follows: Forty-three and one-tenth tons of speiss, containing 11% Pb, 57% Cu, 20% As, 6.6% Sb; eight and eight-tenths tons of slag, containing 0.5% Pb, 15% Cu, 0.5% As, 0.2%

Sb, 10% S, 16% Fe; eighty-five tons of bullion, containing 96.5% Pb, 0.94% Cu, 0.52% As, 1.86% Sb.

It will be observed that the bullion produced contained less than 1% Cu. The slag had a copper to lead ratio of 30 to 1 and the speiss, a copper to lead ratio of better than 5 to 1; whereas in accordance with standard procedure heretofore practiced of treating a like dross in the reverberatory using siliceous ores and scrap iron as fluxing agents and operating at temperatures of 1300°–1400° C., it was not uncommon to produce speiss and matte having a copper to lead ratio of 2 to 2.5 to 1 and a lead bullion containing upwards of 4% copper.

It will be apparent from the foregoing that the treatment of copper-lead dross in accordance with this invention has the advantages of lower fuel consumption, because of the lower working temperature; less copper is retained in the bullion; and less lead is retained in the speiss.

Generally speaking, copper-lead drosses may be encountered in commercial practise which will assay 18% to 30% Cu, 50% to 65% Pb and will contain varying amounts of As, Sb, S and Fe. If the antimony in the dross is low, the copper speiss produced by using flux in accordance with the invention will approximate a true copper arsenide with some lead in solution. If an appreciable amount of antimony is in the dross, copper speiss will consist substantially of a mixture of copper arsenide and copper antimonide when treated according to the invention. But in any case, the Fe and S in the speiss will be very low as these elements may be slagged off. A typical analysis of the slag is 13.3% Cu, 2.9% Pb, 16.1% Fe and 7% S. It will be noted that this copper-lead ratio of the slag itself is better than 5 to 1 and this may be shipped to the copper plant, with the result of eliminating the usual circulating load of copper in the lead blast furnace.

Of no lesser significance is the grade of copper speiss produced. Instead of producing a speiss or matte with a copper to lead ratio of 2–2½ to 1, as has been common heretofore, the speiss produced by the invention will contain from 55% to 65% Cu and less than 12% Pb; 9% Pb being not uncommon or a ratio of copper to lead of 5 or 6 to 1. Moreover, in practicing the invention, it is not uncommon to produce bullion from the reverberatory containing as little as 0.5% Cu.

Inasmuch as the invention provides a smelting process which may be carried out in the reverberatory at a temperature below or not substantially higher than 1000° C., there is a material saving in fuel. And we have found that an operating temperature of about 900° C. is very effective. We believe the relatively low temperature at which our process may be practiced accounts in part for the improved and desirable results because the relatively low temperature permits only of lower solubility of lead in the speiss and the flux permits of better liquation and separation of the metallic lead from the speiss.

The amount of sodium carbonate required for the process to function effectively depends to a great extent upon the amount of iron oxide present. We have found that from 2% to 6% of sodium carbonate by weight of dross is effective in treating copper-lead drosses generally encountered in commercial practice. But we prefer to use about 3% by weight of dross to be treated. However, if the Fe in the dross runs relatively high we have found it desirable to increase the amount of sodium carbonate in the flux.

The amount of coke used in carrying out the process may range from .75% to 2.5%. While a greater percentage of coke may be used, the additional expense is not generally warranted and there is likelihood of producing a slower and more refractory smelting charge. We have found in practicing the invention that 1.0% to 1.5% by weight of the dross to be preferable in obtaining the best results.

The amount of litharge to be added to the flux will depend upon the quantity, if any, present in the dross. If substantial quantities are already present it may be unnecessary to add additional litharge as that present will react with the added sodium carbonate and coke if intimately mixed with the dross charge. Otherwise, the amount of litharge to be added, preferably in the form of litharge slag, produced as mentioned hereinbefore, will range up to about 3.5% by weight of the dross charge. We have found the preferable range to be 2% to 2.5% by weight of the dross when treating drosses generally encountered in commercial operations.

In practicing our invention, we have obtained best results by using fine coke and making certain that the sodium carbonate, coke and litharge slag are intimately mixed with the dross. Smelting will proceed at a rapid rate at under 1000° C. provided the slag is removed currently and the furnace kept clear of accumulations of same. We have observed that at least some of the magnetite is held in suspension in the slag; some is in solution and some in chemical combination; and current skimming will remove this iron. The furnace should be skimmed clean particularly before any shut down or delay to smelting operation; otherwise a magnetic oxide crust is apt to segregate in the furnace, which will interfere with smelting rate and may entail the use of excess soda and higher temperature to remedy the situation. The reverberatory should, if possible, operate on a minimum draft to avoid mechanical carrying over of fine sodium carbonate into the flue since it is apt to form accretions therein as well as resulting in the loss of its effective use.

In addition to the treatment of copper-lead dross, our process can be applied advantageously to the treatment of copper-leady mattes having a poor copper-lead ratio. We have treated matte assaying: 43% Cu, 22% Pb, 15% S, 12% Fe and removed or "thrown out" in the reverberatory 75% of the lead content as metallic lead by proper adjustment of the sodium carbonate, coke, litharge, flux and at the same time producing a copper speiss having a copper to lead ratio of better than 5 to 1. These desirable results can be obtained either by treating the leady matte separately or by incorporating it in the same furnace with the copper-lead dross. However, in the treatment of matte containing particularly high amounts of iron and sulphur we have in some instances had to increase the amount of sodium carbonate in the flux to ten per cent by weight of the matte treated.

The terms and expressions which have been employed in the foregoing are used as terms of description and it will be understood that in the use of such terms and expressions and in practicing the invention equivalents are possible and are to be included within the scope of the invention claimed.

What is claimed is:

1. Process of smelting copper-lead dross and the like containing substantial quantities of copper and lead which comprises treating the charge in a reverberatory furnace in the presence of sodium carbonate, litharge and a carbonaceous reducing agent in sufficient amount and at a temperature to cause a slag, and speiss to be formed in which speiss the copper to lead ratio is at least 5 to 1.

2. Process of treating copper-lead dross and the like containing substantial quantities of copper and lead which comprises smelting the charge in a reverberatory furnace in the presence of a flux comprising 2% to 6% of sodium carbonate, 0.1% to 3.5% of litharge and 0.75% to 2.5% of coke at a temperature of from 800° to 1000° C., to produce a slag, copper speiss and lead bullion, said percentages being by weight based upon the weight of dross being smelted.

3. Process of treating copper-lead dross containing from 18% to 30% copper, 50% to 65% lead and smaller amounts of iron which comprises smelting the dross in a reverberatory furnace in the presence of a flux comprising 2% to 6% by weight of dross charged of sodium carbonate, litharge and 0.75% to 2.5% by weight of dross charged of coke at a temperature below 1000° C. to cause a slag, speiss and bullion to be produced, which slag shall collect substantially all of the iron of the dross, which speiss shall have a copper to lead ratio of at least 5 to 1 and which bullion shall contain less than 1% of copper.

4. A process of treating a copper-leady matte having a copper to lead ratio of no greater than 3 to 1 copper to lead to remove lead therefrom and to improve the copper lead ratio which comprises smelting said matte in a reverberatory furnace in the presence of a flux comprising sodium carbonate up to 10% based upon weight of the matte charged, coke and litharge intimately mixed with the matte while maintaining the furnace at a temperature not substantially higher than 1000° C. to produce a copper speiss having a copper lead ratio of at least 5 to 1 and a bullion containing less than 1% copper.

5. A process of treating a dross, matte or the like, containing substantial quantities of copper, lead and an appreciable quantity of iron, to separate lead therefrom which comprises smelting the charge in a reverberatory furnace in the presence of a flux of sodium carbonate, coke and litharge to produce a slag which collects substantially all of the iron in the charge, and to produce a speiss in which liquation and separation of metalic lead therefrom is facilitated while maintaining the operating temperature not substantially higher than 1000° C. and at which the solubility of lead in the speiss and copper in the bullion is low.

6. A process of treating a dross, matte or the like, containing substantial quantities of copper, lead and an appreciable quantity of iron, to separate lead therefrom which comprises smelting the charge in a reverberatory furnace in the presence of at least 3% sodium carbonate, at least 1% coke and at least 2% litharge by weight based upon the charge, to form a slag which collects substantially all of the iron in the charge, and to form a speiss in which liquation and separation of metallic lead therefrom is facilitated while maintaining the operating temperature of said furnace below 1000° C. whereby to produce a copper speiss having a copper to lead ratio of better than 5 to 1 and a lead bullion containing less than 1% copper.

7. A metallurgical process which comprises intimately intermixing a dross containing from 18% to 30% copper, 50% to 65% lead and smaller amounts of arsenic, antimony, sulphur and iron with from 2% to 6% of sodium carbonate based upon the weight of dross, from .75% to 2.5% of coke based upon the weight of dross, and small amounts of litharge up to 3.5% based upon the weight of dross, whereby to prepare a smeltable charge, smelting said charge in a reverberatory furnace while maintaining the operating temperature therein at less than 1000° C. thereby to form a slag which collects substantially all the iron in the charge being smelted together with some copper and lead in a ratio at least 5 to 1 of copper to lead, a copper speiss containing at least 50% copper and some lead in a ratio at least 5 to 1 of copper to lead, and a lead bullion containing not more than 1% copper.

8. A metallurgical process which comprises intimately intermixing a dross containing from 18% to 30% copper, 50% to 65% lead and smaller amounts of arsenic, antimony, sulphur and iron with from 3% to 5% of sodium carbonate, from 1.0% to 1.5% of coke, and small amounts of litharge up to 2% by weight based upon the dross, whereby to prepare a smeltable charge, smelting said charge in a reverberatory furnace while maintaining the furnace at a temperature below 1000° C. thereby to form a slag which collects substantially all the iron in the charge being smelted together with some copper and lead in a ratio at least 5 to 1 of copper to lead, a copper speiss having a copper to lead ratio at least 5 to 1, and a lead bullion.

9. A metallurgical process which comprises intimately intermixing a dross containing from 18% to 30% copper, 50% to 65% lead and smaller amounts of arsenic, antimony, sulphur and iron with about 3% of sodium carbonate, about 2% of coke, and small amounts of litharge up to 3.5% by weight based on the weight of dross whereby to prepare a smeltable charge, smelting said charge in a reverberatory furnace while maintaining the operating temperature therein at about 900° C. thereby to form a slag which collects substantially all the iron in the charge being smelted together with some copper and lead in a ratio at least 5 to 1 of copper to lead, a copper speiss containing at least 50% copper and some lead in a ratio at least 5 to 1 of copper to lead, and a lead bullion containing not more than 1% copper.

10. Process of smelting copper-lead dross, and the like, containing substantial quantities of copper and lead and some arsenic which comprises treating a charge of such material in a reverberatory furnace in the presence of sodium carbonate, litharge and a carbonaceous reducing agent in controlled proportions and at a temperature to form a lead bullion, a slag and a copper speiss wherein the speiss has a copper to lead ratio higher than 2.5 to 1.

EDWARD P. FLEMING.
DONALD H. McINTOSH